United States Patent
Callaghan (10) Patent No.: US 10,920,923 B1
(45) Date of Patent: Feb. 16, 2021

(54) PORTABLE MOUNT

(71) Applicant: John A Callaghan, Charleston, SC (US)

(72) Inventor: John A Callaghan, Charleston, SC (US)

( * ) Notice: Subject to any disclaimer, the term of this patent is extended or adjusted under 35 U.S.C. 154(b) by 0 days.

(21) Appl. No.: 17/007,485

(22) Filed: Aug. 31, 2020

Related U.S. Application Data (60) Provisional application No. 62/930,023, filed on Nov. 4, 2019.

(51) Int. Cl.
| | |
|---|---|
| *F16M 11/00* | (2006.01) |
| *F16M 11/28* | (2006.01) |
| *F16M 13/02* | (2006.01) |
| *B63B 49/00* | (2006.01) |

(52) U.S. Cl.
CPC ............ *F16M 11/28* (2013.01); *B63B 49/00* (2013.01); *F16M 13/022* (2013.01); *F16M 2200/08* (2013.01)

(58) Field of Classification Search
CPC .. F16M 11/28; F16M 13/022; F16M 2200/08; B63B 49/00; B63B 17/00; B60R 11/0235
USPC ..... 248/125.1, 125.2, 220.21, 220.22, 218.4, 248/309.1, 176.1; 114/343, 364
See application file for complete search history.

(56) References Cited

U.S. PATENT DOCUMENTS

| | | | |
|---|---|---|---|
| 5,031,566 A | 7/1991 | Switzer | |
| 5,052,645 A | 10/1991 | Hixon | |
| 5,479,872 A | 1/1996 | Hulett | |
| 5,529,272 A | 6/1996 | Baublitz | |
| 6,065,420 A * | 5/2000 | Smith | B63B 49/00 114/343 |
| 7,744,046 B1 * | 6/2010 | Lundy | B60R 11/02 248/121 |
| 8,430,051 B1 * | 4/2013 | Allison | B63B 49/00 114/364 |
| 9,168,982 B1 * | 10/2015 | Robichaux, Jr. | B63B 25/002 |
| 9,307,832 B1 * | 4/2016 | Cameron | F16M 11/28 |
| 9,623,940 B1 | 4/2017 | Robichaux | |
| 9,816,661 B2 | 11/2017 | Sharrah | |
| 2008/0035806 A1 | 2/2008 | Sporay | |
| 2008/0296547 A1 * | 12/2008 | Renteria | E04H 17/1413 256/19 |
| 2016/0218547 A1 * | 7/2016 | Corley | H01R 33/94 |

* cited by examiner

*Primary Examiner* — Todd M Epps
(74) *Attorney, Agent, or Firm* — Jeffrey Joyce, Esq.

(57) ABSTRACT

A portable mounting device that is configured to mount relatively small accessory devices, such as radars or lights, on a vessel or vehicle, such as a boat. The device uses a number of connectors that enable its components to be easily assembled and disassembled for ease of use, transportation, and storage, while still forming a strong device that is capable of supporting the accessory device.

15 Claims, 11 Drawing Sheets

PORTABLE MOUNT

BACKGROUND INFORMATION

Field of the Invention

The invention relates to marine vessels, and in particular to mast and mounting systems for supporting vessel accessories and instruments.

Discussion of Prior Art

Marine vessels commonly use a number of instruments and accessories to assist in navigation and general ease and enjoyment of operating the vessel, such as, for example, radars, lights, charting devices, and radios. However, not all vessels are designed in a manner that facilities permanent mounting of such devices. Additionally, in other instances, it may not be desirable to have such devices permanently affixed to the vessel.

For example, a portable radar has recently been developed. Unlike past radars this radar does not require professional electrical and fixed mount installation. It also does not require an expensive Chart Plotter. The portable radar works by using a built in WIFI to send a signal to a mobile device such as tablet or smart phone. The portable radar is powered by a simple two wire connection that plugs into the boats 12 volt battery.

However, while the radar is portable, it lacks an equally portable mounting device as virtually all mounting devices are affixed to the vessel in some manner. This is often undesirable for a number of reasons, from the addition of unnecessary hardware to an appearance that some find unsightly.

What is needed, therefore, is a mounting device that is portable, easy to assemble, and capable of supporting accessory devices.

BRIEF SUMMARY OF THE INVENTION

The invention is a portable mounting device that may be easily assembled and mounted to any number of surfaces such as, for example, vessels or vehicles. The assembled device is sturdy and is able to bare the weight of the many accessory devices. While it is not limited to any particular use it is ideally suited to support accessory devices that are mounted on small watercraft such as radars, lights, charting devices, and radios. When the accessory device is not needed the portable mounting device is easily disassembled and stowed or moved to a different mounting location.

The device generally includes two or three sections, for example an upper section and a lower section, that are easily assembled in a secure manner to provide the height needed for the accessory device while also being easily disassembled for compact storage or transportation. The accessory device is affixed to an accessory securing device that is attached to an upper tube section. The upper tube section is attached to the lower tube section. The lower tube section slides into a base flange on a vessel securing device that is attached to a surface, for example the top or side of the gunwale on a watercraft.

The parts of the device are likely all marine grade and constructed from materials such as powder coated aluminum, stainless steel, aluminum, plastics, or other similarly suitable materials.

The connections between the device components are important for the structural integrity of the assembled device, particularly to construct a device that is light and compact for storage and transportation but also sturdy enough to support the accessory. To connect the various components connectors are provided that are configured to be inserted into the tubes and expand within the tube to press firmly within the tubes. For example, the connector may itself be a small tube having a diameter that is slightly smaller than the tubes. There is a slot on in the side and a small opening opposite the slot, and a threaded fastener that is positioned inside the tube and horizontally aligned in an interior plate. Rotating the threaded fastener causes it to move in or out of the slot, which causes the connector to expand or retract depending on the direction of rotation.

Installation is easy with this lightweight and compact portable mounting device. The device may conveniently be carried by a user from one location to another and be easily stored away until needed.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-11 illustrate the portable mounting device 100 according to the invention, including one or more support tubes 10, a vessel securing device 40, and an accessory securing device 70. In use, the vessel securing device 40 is affixed to the vessel V. To mount an accessory device D the one or more support tubes 10 are assembled into a support post 11, the device D is attached to the accessory securing device 70 and the accessory securing device 70 is secured an upper end of the support post 11. A lower end of the support post 11 is then secured to the vessel securing device 40. The connections between the components 10, 40, and 70 are configured to be made quickly and securely such that assembly and disassembly is quick and effective. This disclosure generally discusses the mounting device in terms of is use with a watercraft and a radar, however, this is merely an example use and the device may be mounted on any number of surfaces and support any number of device and this disclosure is in no way limited to watercrafts and radars.

In the embodiment shown the one or more support tubes 10 include an upper tube 12 and a lower tube 14. A tube connector 16 is used to combine the upper 12 and lower tube 14 into a single support post 11.

The vessel securing device 40 is comprised of a vessel base plate 42 and a vessel base flange 44, the vessel base plate 42 being affixable to a vessel V and the vessel base flange 44 having a first end that is secured to the vessel base plate 42 and a second end that is securable to a lower end of the support post 11. The base plate 42 and flange 44 are connected using conventional means.

The accessory securing device 70 similarly includes an accessory base plate 72 and an accessory base flange 74, the accessory base plate 72 being securable to an accessory device D and the accessory base flange 74 having a first end that is secured to the accessory base plate 72 and a second end that is securable to an upper end of the support post 11. The base plate 72 and flange 74 are connected using conventional means.

Figure 1:
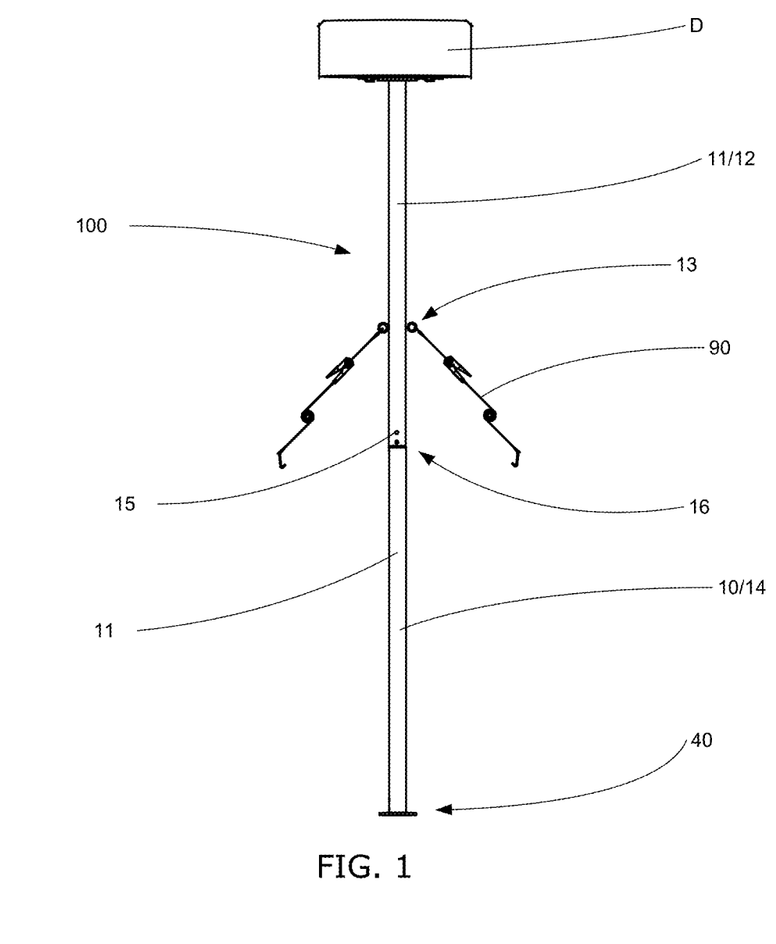
FIG. 1 front view of the fully assembled device according to the invention.
Figure 2:
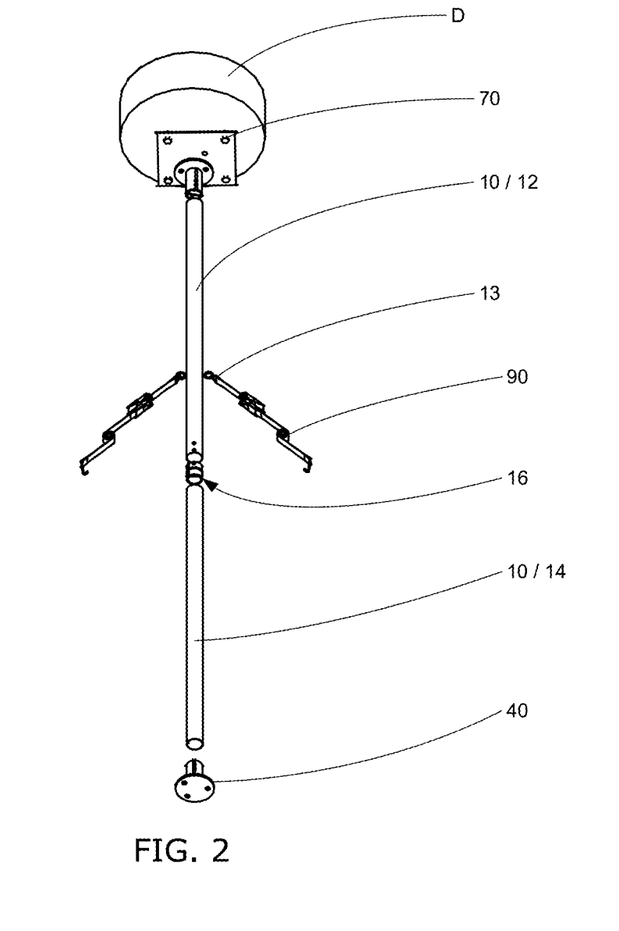
FIG. 2 is a front perspective view of the device showing the connections slightly apart.
Figure 3:
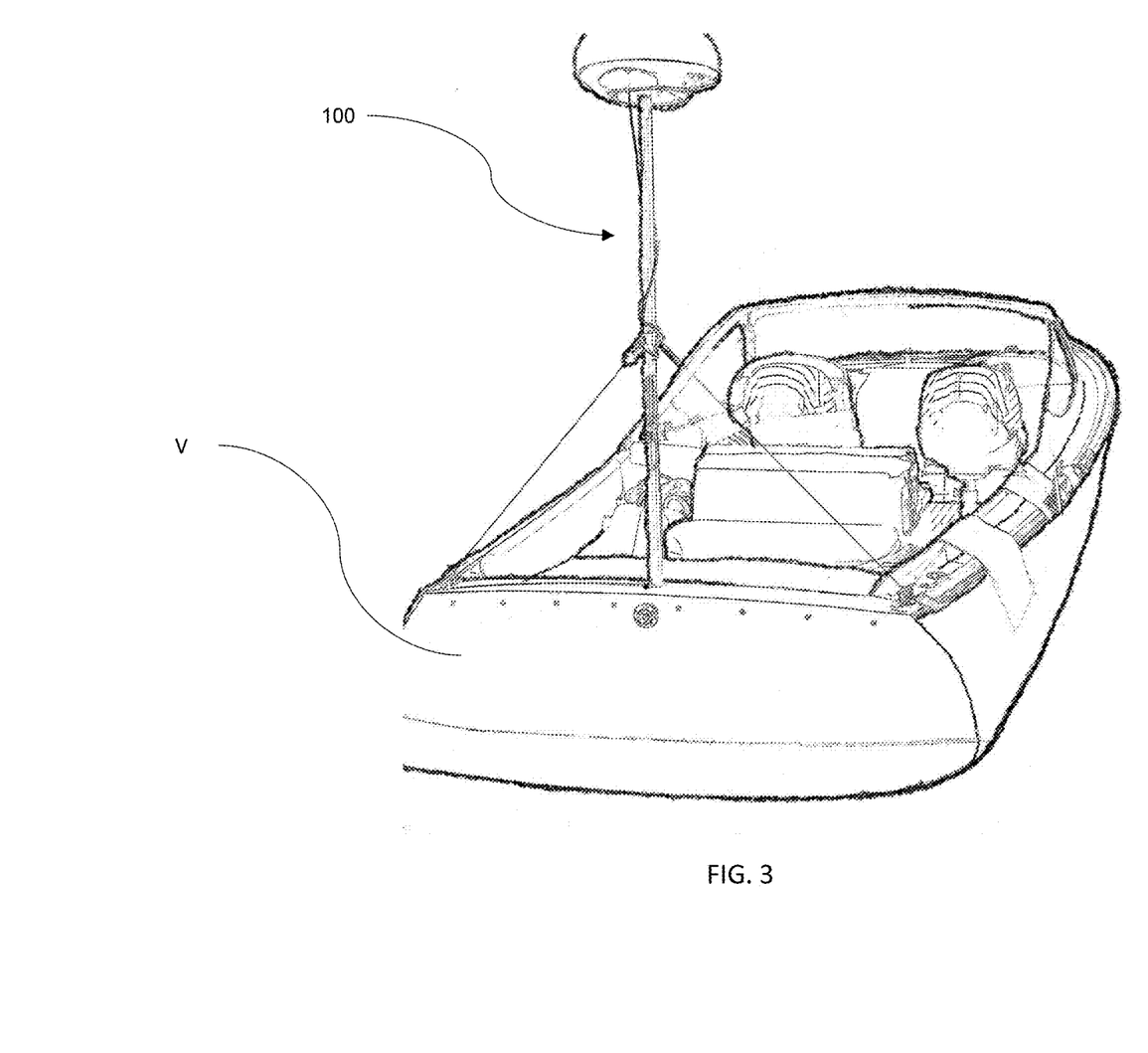
FIG. 3 is a view of the device attached to a boat.
Figure 4:
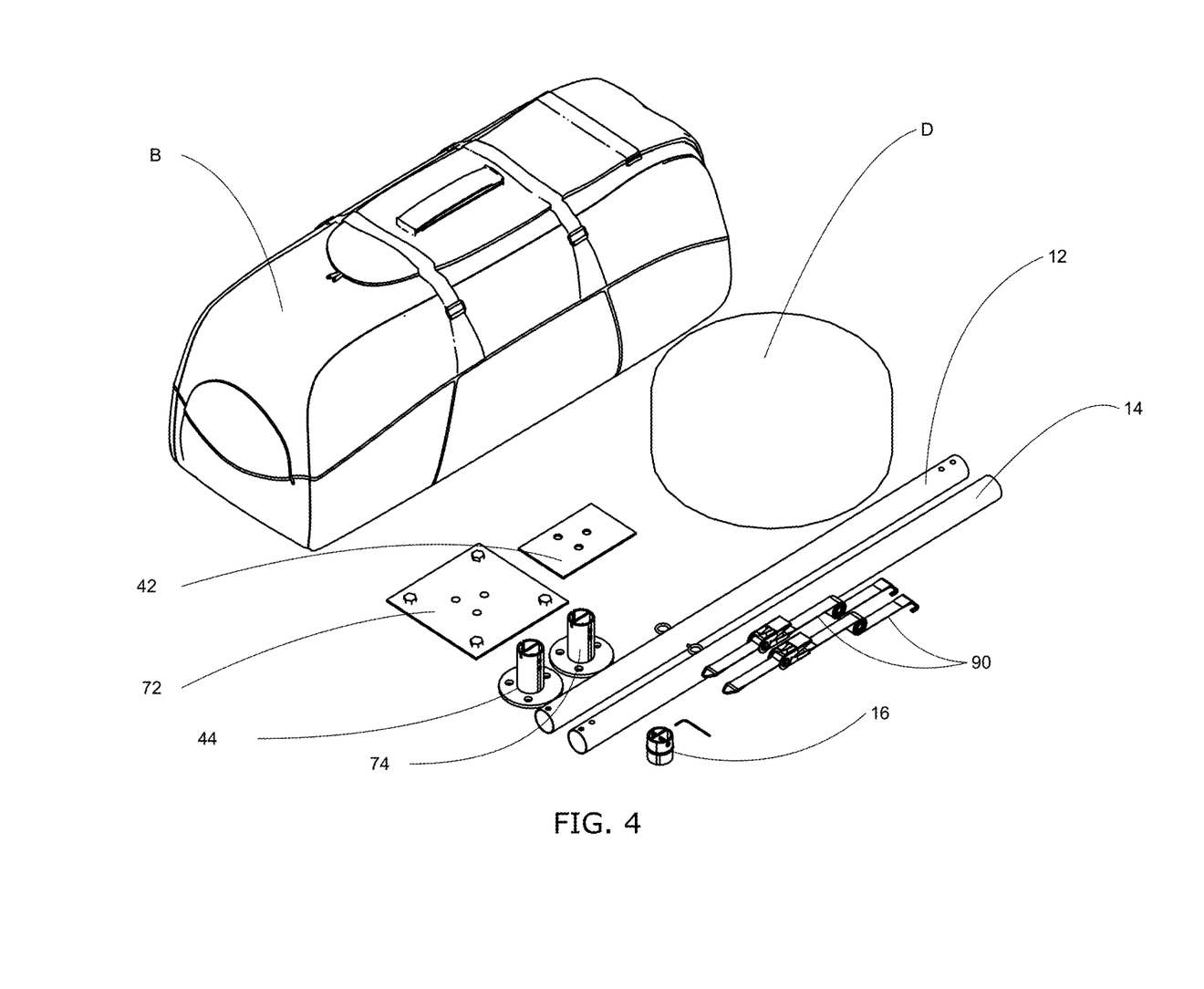
FIG. 4 is a view of the device in a completely disassembled state.
Figure 5:
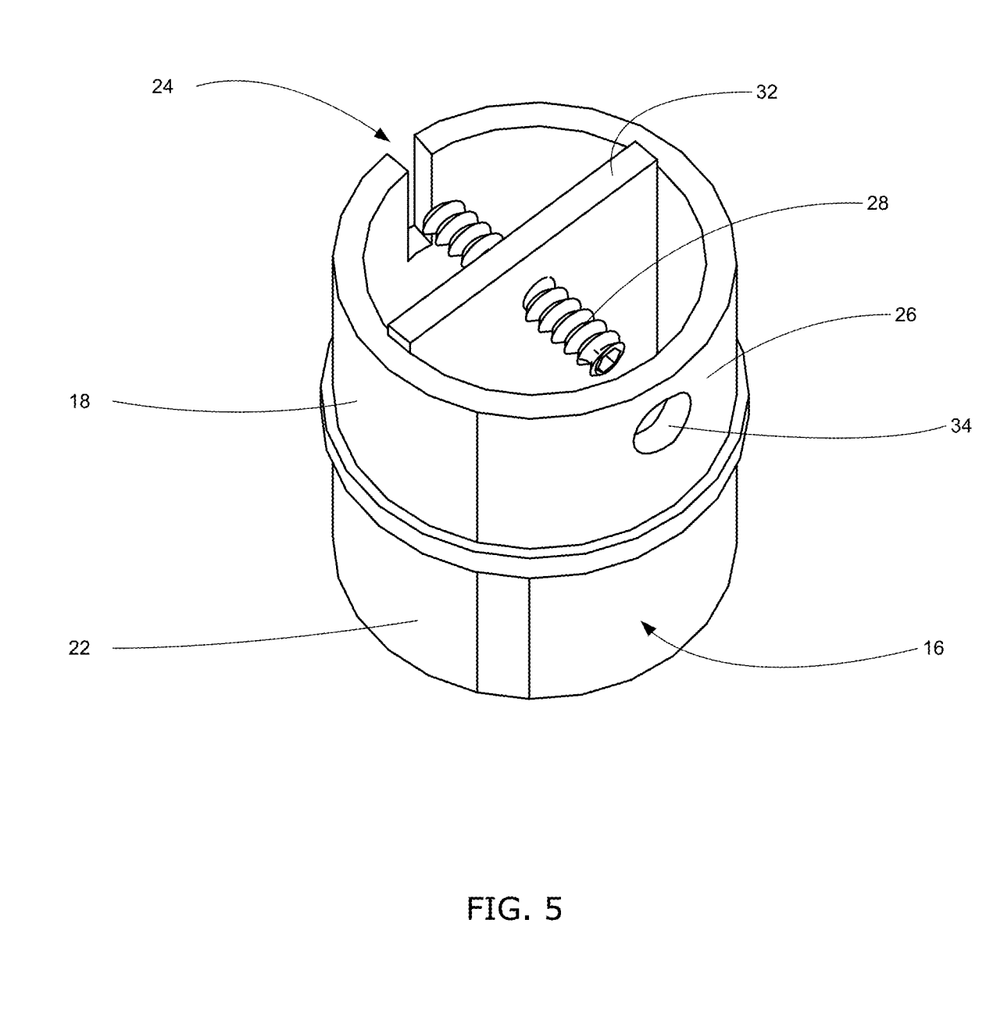
FIG. 5 perspective view of a connector.

The connector 16, best shown in FIG. 5, is made of a sturdy and resistant material such as, for example, powder coated aluminum, stainless steel, or a suitably strong plastic. The connector 16 has an upper end 18 for securing to the upper tube 12 and a lower end 22 for securing to the lower tube 14. Each of the upper end 18 and lower end 22 are sized to be slightly smaller in diameter than the upper tube 12 and lower tube 14 such that each end of the connector fits into the upper tube and lower tube respectively.

The upper end of the connector 18 includes a slot 24 in a portion of a side wall 26, and a threaded fastener 28, for example a set screw, that is horizontally aligned in an interior plate 32. A portion of the sidewall 26 that is opposite the slot 24 has an opening 34 that allows an operator access and operate the threaded fastener 28. A lower end of the upper tube 12 includes a corresponding opening 15. To secure the connector 16 in the upper tube 12 the upper end 18 is inserted into the upper tube 12 with the two openings 34, 15, in alignment and the threaded fastener 28 is rotated such that it moves into the slot 24 causing the slot 24 to expand which causes the upper end 18 of the connector 16 to expand within the upper tube 12 and create a secure fit within the upper tube 12. The lower end 22 is fixedly secured in the lower tube 14 using conventional means such as an adhesive, however, the same slot and threaded fastener design may be used in the lower end 22 of the connector 16 to so that the connector 16 is easily removable from both tubes.

Figure 6:
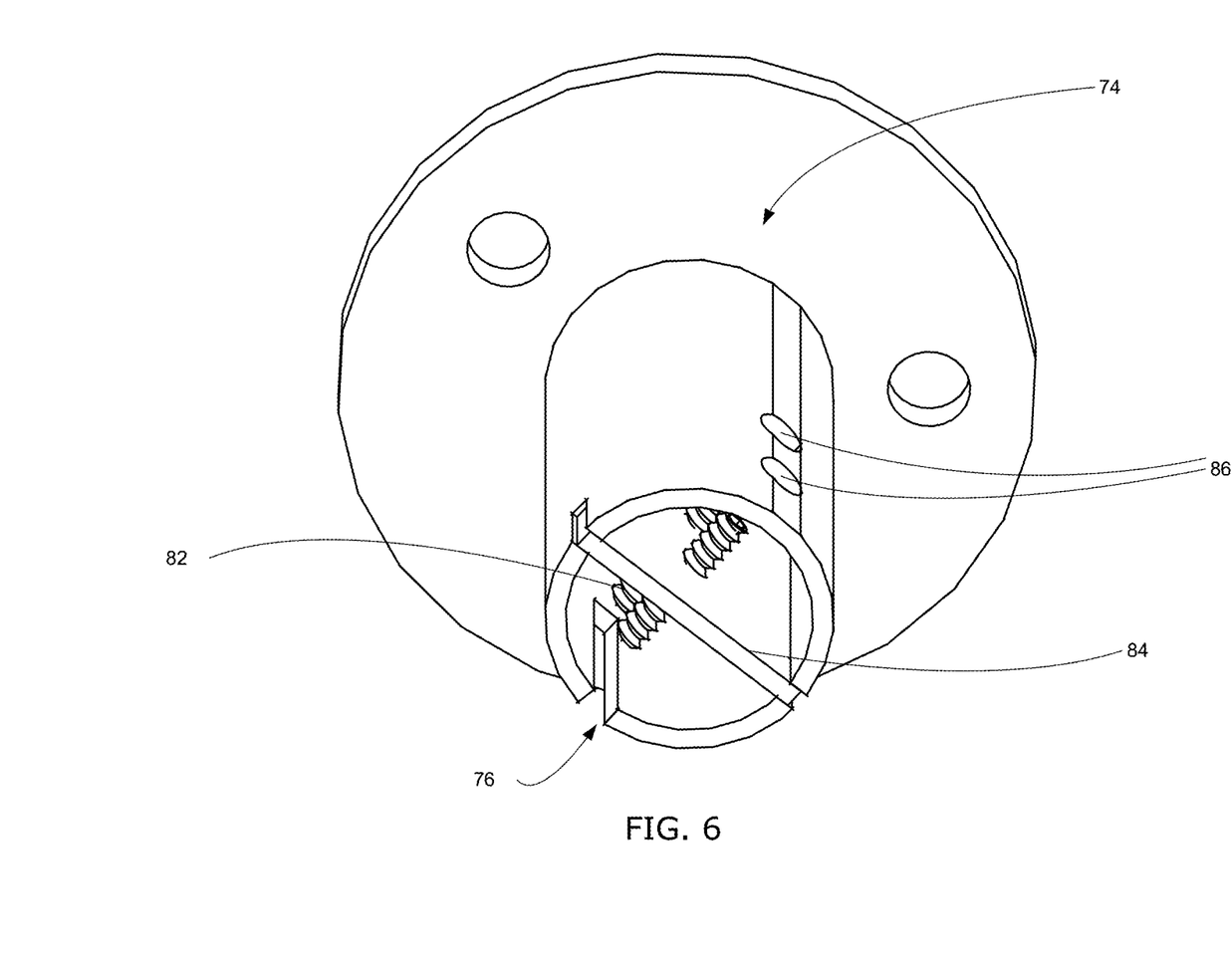
FIG. 6 is perspective view of the device mounting plate.
Figure 7:
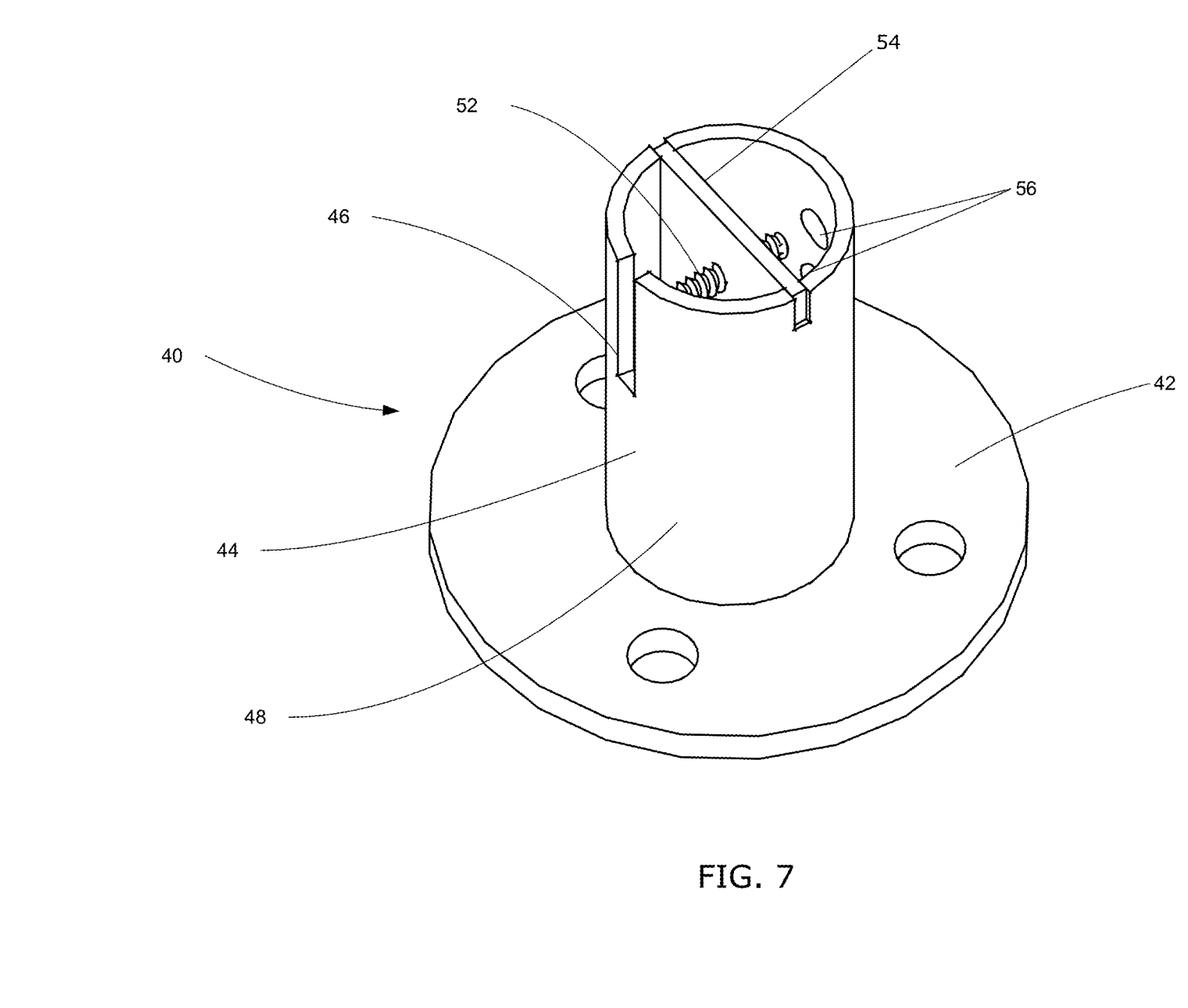
FIG. 7 is a perspective of the vessel mount plate with a lower connector.
Figure 8:
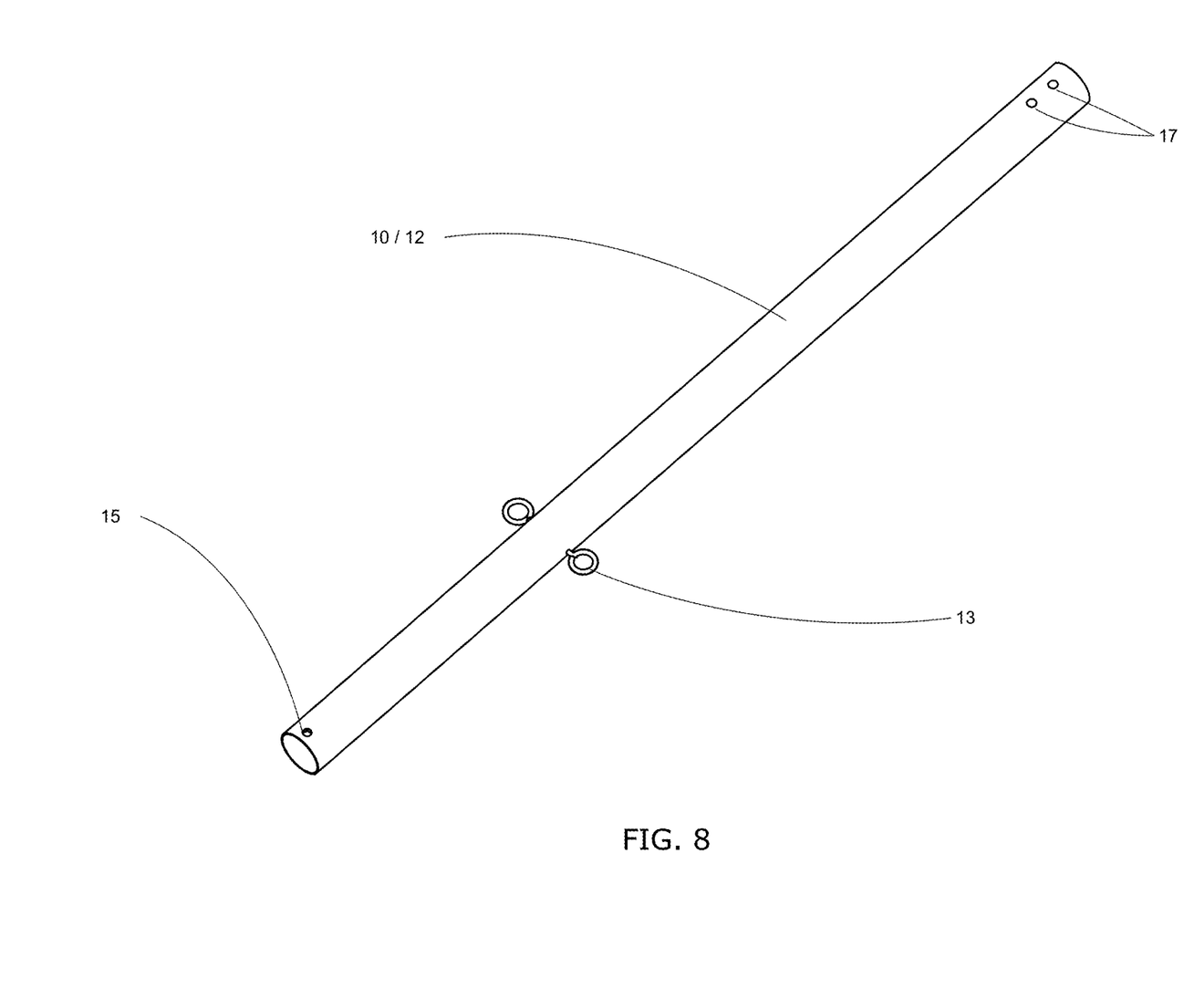
FIG. 8 is a side perspective view of a top mounting tube.
Figure 9:
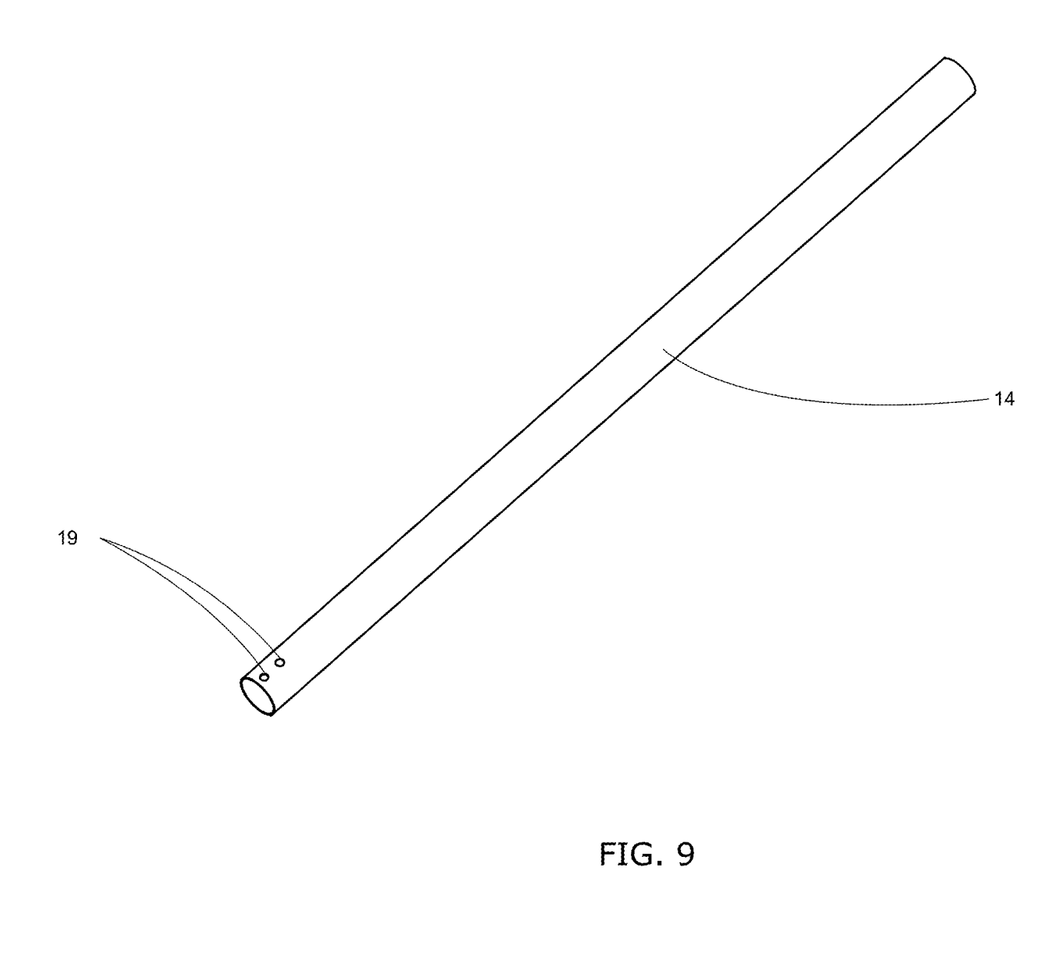
FIG. 9 is a side perspective view of a lower mounting tube.
Figure 10:
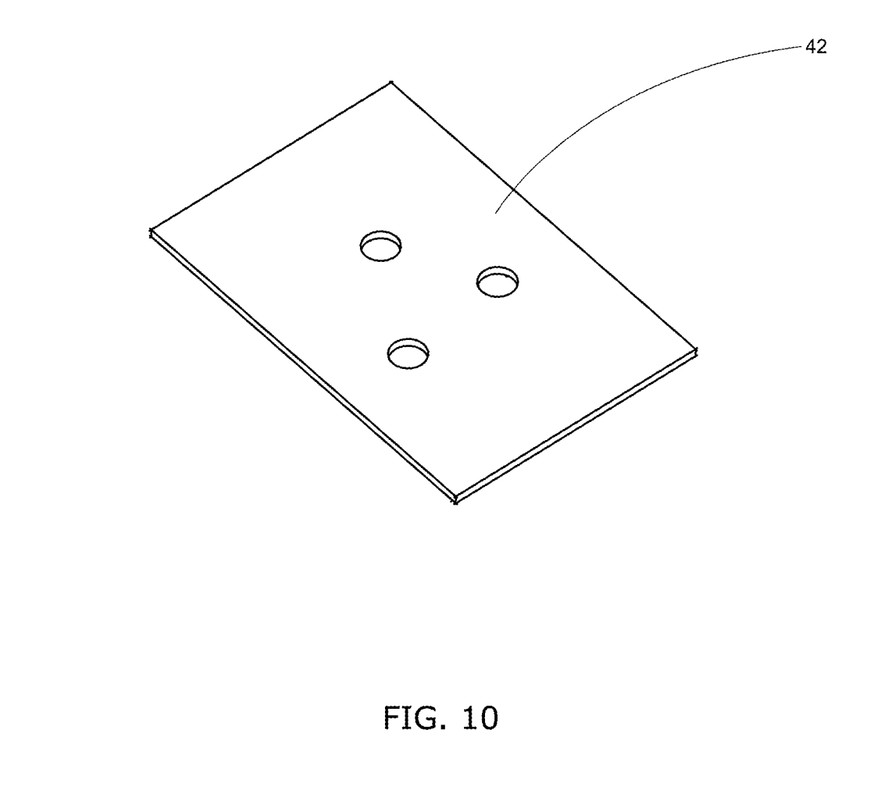
FIG. 10 is a top plan view of the device mounting plate.
Figure 11:
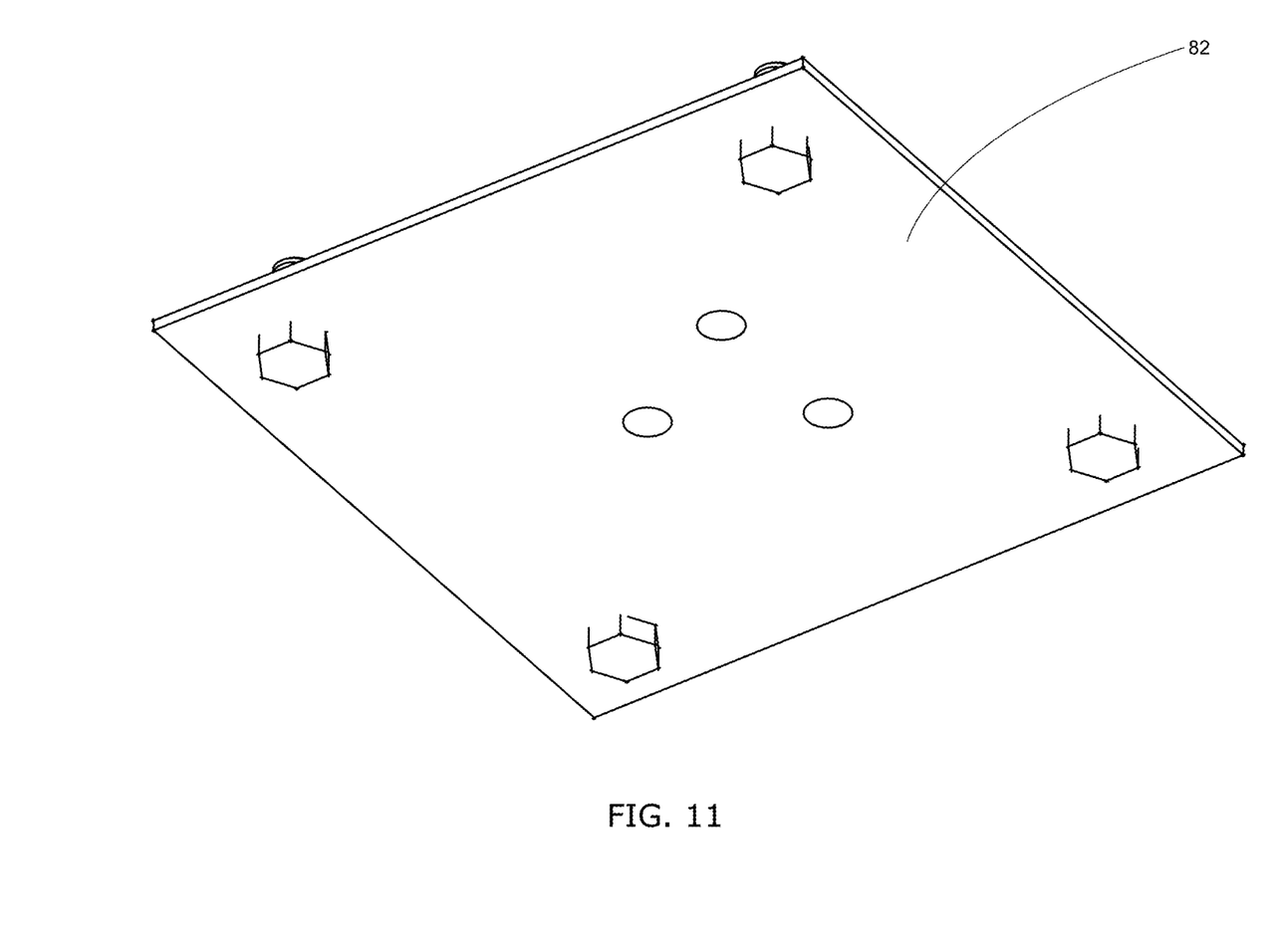
FIG. 11 is a perspective view of vessel mount plate.

The vessel base flange 44, best shown in FIG. 7, and the accessory base flange 74, best shown in FIG. 6, each use a similar approach in forming a connection with the support post 11 as the connector 16. More specifically, each flange 44, 74 includes a slot 46, 76 in a portion of a side wall 48, 78, and one or more threaded fasteners 52, 82 that is/are horizontally aligned in an interior plate 54, 84. Openings 56, 86 are provided on a portion of the sidewall 48, 78 that is opposite the slot 46, 76 and allows an operator access to the threaded fastener. Corresponding openings 17, 19, are placed in the upper tube 12 and lower tube 14 to allow a user to operate the threaded fasteners with the parts are together. Once the respective ends of the support post 11 are inserted over the flanges 44, 74 the threaded fasteners 52, 82 are tightened to expend the flanges 44, 74 and secure the support post 11 in the operational position.

The accessory base plate 72 and vessel base plate 42 are likely to be semi-permanently affixed to the accessory device D and vessel V, respectively, for example, by using conventional threaded fasteners such as nuts and bolts. Multiple vessel base plates 42 may be secured to multiple vessels V so that portable mast device 100 and accessory device D may be portably used on multiple vessels V.

Support straps 90 may also be deployed to further secure the support post 11 in the operational position. For these, the support post 11 may have additional attachment points 13, such as, for example, eyebolts 13. The support straps 90 may be in the form of tie downs that are attached on one end to the eyebolts 13 and on the other end to conventional cleats that are found on many boats.

To setup and install the portable mast device 100 a user first installs the vessel attachment device to the vessel and the accessory attachment device to the accessory. The accessory attachment device is then attached to the upper tube and the threaded fasteners are tightened to secure the connection. The lower tube, which includes the connector, is inserted onto the vessel attachment device and again the threaded fasteners are tightened to secure the attachment. The upper tube is then inserted over the connector and the threaded fastener is tightened to secure the upper tube to the lower tube. The straps are then connected to the eyebolts on the support post and the cleats on the boat.

To disassemble the fully assembled portable mast device a user first removes the straps. Next, the user loosens the threaded fastener in the connector and separates the upper tube from the lower tube. The user then separates the accessory device from the upper tube and the lower tube from the vessel, after which the two tubes, and accessory device may all be packed away for storage or transport via a storage bag B.

The size and choice of materials for each of the components may vary depending on the desired size and strength of the device. For small crafts, having two tubes that each measure from 3 feet to 4 feet in length is likely to provide sufficient height. The components must be made of a sturdy and resilient material such that the assembled device is able to bear the weight of the mounted radar while also being resistant to a marine environment. Stainless steel, aluminum, and suitably strong plastics are all acceptable choices as materials.

It is understood that the embodiments described herein are merely illustrative of the present invention. Variations in the construction of the portable mast device may be contemplated by one skilled in the art without limiting the intended scope of the invention herein disclosed and as defined by the following claims.

What is claimed is:

1. A portable mounting device adapted to mount an accessory on a vessel, the portable mounting device comprising:
   a support post having an top end and a bottom end, the top end connectable to the accessory and the bottom end connectable to the vessel, the support post including at least two sections including an upper section and a lower section;
   a post connector that is configured to releasably connect the upper section to the lower section, the post connector having an upper post connector end that is configured to fit with the upper section in a manner that secures the upper post connector end to the upper section and a lower post connector end that is configured to fit with the lower section in a manner that secures the lower post connector end to the lower section; and wherein at least one of the upper post connector end or lower post connector end is configured to expand inside the upper section or lower section to secure the post connector inside of the upper section or lower section.

2. The portable mounting device of claim 1, wherein at least one of the upper post connector end or lower post connector end has a slot in a sidewall and a threaded fastener that is insertable into the slot such that when the threaded fastener is inserted the slot expands.

3. The portable mounting device of claim 1, wherein the support post is made of powder coated aluminum.

4. The portable mounting device of claim 1, further including at least one strap that has a first end that connects to the support post and a second end that connects to the vessel.

5. The portable mounting device of claim 1, further including the top end configured to connect to an accessory mount device and the bottom end configured to connect to a vessel mount device and wherein the accessory mount device secures the support post to the accessory and the vessel mount device secures the support post to the vessel.

6. The portable mounting device of claim 5, the accessory mount device including an accessory base plate and an accessory base flange, the accessory base plate being securable to the accessory device and the accessory base flange having a first end that is affixed to the accessory base plate and a second end that is securable to the top end.

7. The portable mounting device of claim 6, wherein the accessory base flange includes an accessory base slot in a portion of a sidewall and one or more threaded fasteners that are horizontally aligned in an interior plate.

8. The portable mounting device of claim 7, wherein the one or more threaded fasteners includes two threaded fasteners.

9. The portable mounting device of claim 7, wherein the accessory base flange includes an accessory base opening on a position on the sidewall opposite the accessory slot that is configured to allow rotation of the threaded fastener.

10. The portable mounting device of claim 7, wherein the top end includes an opening that is configured to align with the accessory base opening.

11. The portable mounting device of claim 5, the vessel mount device including an vessel base plate and an accessory base flange, the vessel base plate being securable to the vessel device and the vessel base flange having a first end that is affixed to the vessel base plate and a second end that is securable to the bottom end.

12. The portable mounting device of claim 11, wherein the vessel base flange includes an vessel base slot in a portion of a sidewall and one or more threaded fasteners that are horizontally aligned in an interior plate.

13. The portable mounting device of claim 12, where in the one or more threaded fasteners includes two threaded fasteners.

14. The portable mounting device of claim 12, wherein the vessel base flange includes an vessel base opening on a position on the sidewall opposite the vessel slot that is configured to allow rotation of the threaded fastener.

15. The portable mounting device of claim 12, wherein the bottom end includes an opening that is configured to align with the vessel base opening.

\* \* \* \* \*